Figures 1, 2:
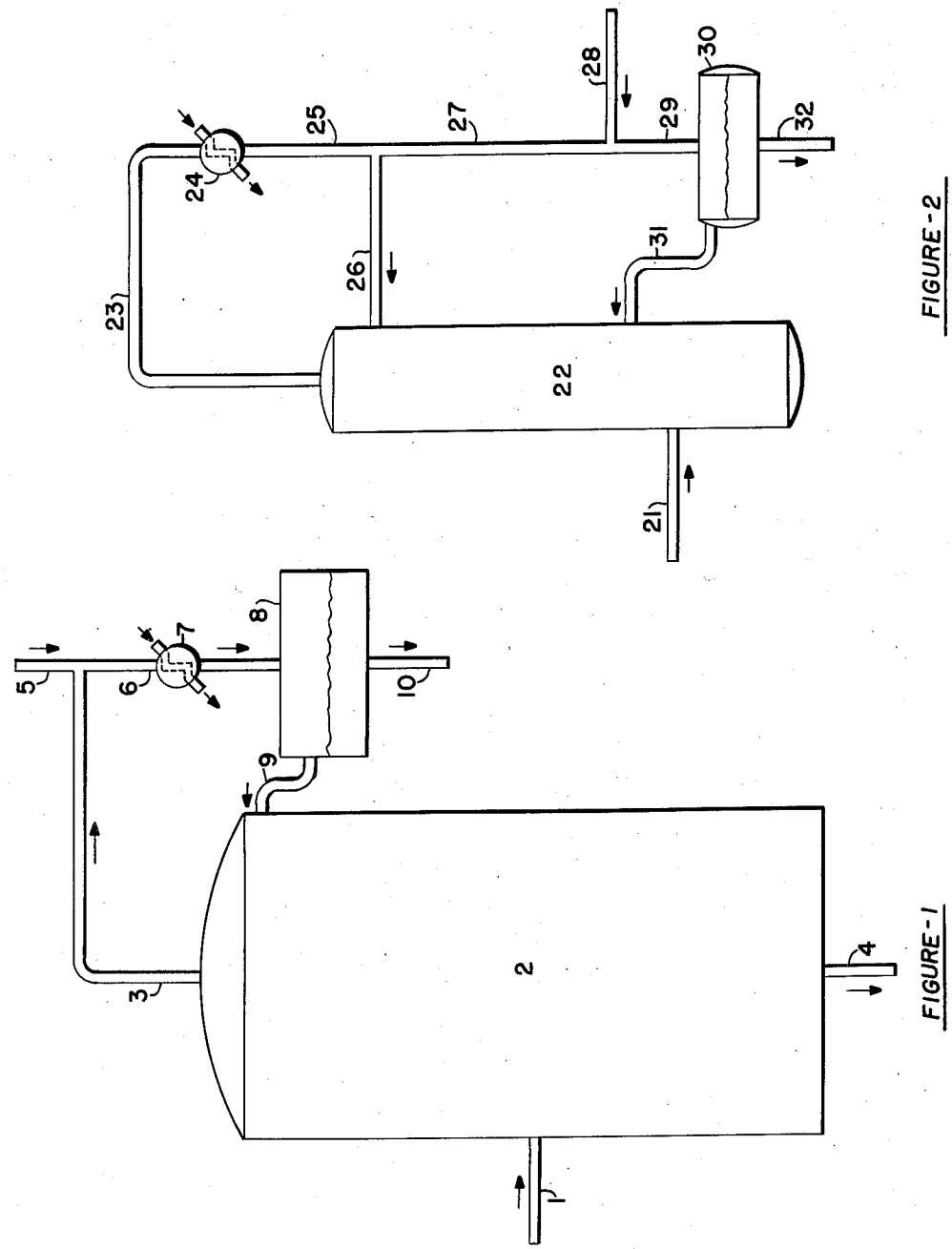

Dec. 2, 1958 J. C. HUNT 2,862,856
PURIFYING ISOBUTYLENE
Filed Feb. 6, 1953

John C. Hunt  Inventor

By W. H. Smyers  Attorney

2,862,856
PURIFYING ISOBUTYLENE

John C. Hunt, Linden, N. J., assignor to Esso Research and Engineering Company, a corporation of Delaware Application February 6, 1953, Serial No. 335,499

2 Claims. (Cl. 202—42)

This invention relates to a method for purifying isobutylene and relates more particularly to the purification of this material to prepare it as a suitable feed stock for the polymerization to solid rubbery-like polymers.

It is known to prepare solid rubbery polymers from isobutylene by contacting it with aluminum chloride or boron fluoride at temperatures as low as —140° F. The isobutylene used in this process must be substantially pure. A suitable method for obtaining isobutylene comprises contacting a hydrocarbon stream, suitably a stream containing largely $C_4$ hydrocarbons, including isobutylene, with 50–65% sulfuric acid to absorb only the isobutylene. Gentle heating of the acid-isobutylene solution causes the isobutylene to be polymerized to the dimer and trimer of isobutylene. These can be easily separated from the acid and cracked back to highly purified isobutylene. An alternate method of preparing isobutylene is the direct regeneration process. However, in both methods the product contains a very small amount of methyl mercaptan as an impurity. This small amount (copper number of 4 to 6) is sufficient to severely poison the polymerization reaction.

It is possible to remove the mercaptan impurities by a number of so-called "sweetening" processes. It was found, for eaxmple, that the well known "doctor sweetening process" was effective in reducing the sulfur content of the isobutylene to a level satisfactory for polymerization to high molecular weight polyisobutylene. Such a process, however, despite its wide use is not a convenient process to operate, even when operated as a continuous unit. The numerous settling drums required in the treating and the necessity of regenerating the doctor solution make the process unadaptable to complete automatic control.

It is also general practice in chemical refining to remove acid impurities such as hydrogen sulfide, sulfur dioxide, sulfur trioxide, low molecular weight mercaptans, organic acids and phenols from petroleum fractions by treatment with alkaline reagents such as sodium hydroxide, sodium carbonate, calcium oxide, calcium hydroxide and potassium hydroxide. In the case of the lower molecular weight mercaptans it is generally considered that for most purposes they can be effectively removed by treatment with a large excess of aqueous caustic soda. The reaction proceeds according to the following equation:

$$RSH + NaOH \rightarrow RSNa + H_2O$$

The degree of completion of the reaction depends on the "R" group, being essentially complete for methyl mercaptan and ranging downward to 63% complete for the butyl mercaptan and 33% complete for the amyl mercaptan.

It has been found, however, that the polymerization of isobutylene to high molecular weight solid rubbery-like polymers is so sensitive to the presence of mercaptans that caustic treating will not remove from the isobutylene sufficient of even the more reactive methyl mercaptan to permit polymerization to a high molecular weight material. Caustic treating is, therefore, by itself not a satisfactory method of removing the mercaptan impurities from isobutylene.

It would appear from examining the boiling points involved that isobutylene with an atmospheric boiling point of —6° C. could be separated by distillation from the lowest boiling mercaptan, methyl mercaptan, which has an atmospheric boiling point of 6° C. On distillation of the impure isobutylene to remove pure isobutylene over head leaving the mercaptan impurities in the bottom it was found that the separation between methyl mercaptan and isobutylene could not be made. The distilled isobutylene contained sufficient impurities to poison its polymerization to a high molecular weight polyisobutylene. Further investigation disclosed that methyl mercaptan forms a minimum boling azeotrope with isobutylene, a phenomenon not previously disclosed in the literature.

The present invention affords a simple, easy, and economically advantageous method of removing this small amount of mercaptan from the isobutylene.

To the accomplishment of the foregoing and related ends, the invention then comprises the features hereinafter fully described, and particularly pointed out in the claims, the following description and the annexed drawings setting forth in detail certain illustrative embodiments of the invention, these being indicative, however, of but a few of the various ways in which the principle of the invention may be employed.

In the drawings Figure 1 is a diagrammatic illustration in sectional elevation of one embodiment of this invention; and Figure 2 represents an alternative embodiment of the invention.

Referring now to Figure 1 substantially pure isobutylene containing a small amount of mercaptan impurity is introduced by line 1 into an intermediate section of a fractionating tower 2 where the isobutylene is distilled to remove overhead through line 3 a vapor approaching in composition the constant boiling mixture of isobutylene and methyl mercaptan. This azeotrope boils at 53° C., and has the composition 78% mol isobutylene and 22% mol methyl mercaptan at 95 p. s. i. absolute. An essentially mercaptan-free isobutylene suitable for polymerization is withdrawn through line 4.

The vapor withdrawn overhead through line 3 is contacted with aqueous caustic introduced through line 5. The mixture of aqueous caustic, isobutylene and mercaptan are passed by line 6 through condenser 7 into drum 8. The condensate forms two layers, an upper layer of isobutylene now reduced in mercaptan content and a lower layer of caustic containing dissolved mercaptides from the reaction of the mercaptans with the caustic. The isobutylene is returned to tower 2 by line 9 as reflux while the caustic is withdrawn through line 10.

Figure 2 represents an alternative embodiment of Figure 1 in which the isobutylene is withdrawn overhead from tower 22 through line 23 and condensed in condenser 24. The condensate leaving condenser 24 through line 25 is divided into two parts. Part is recycled back to the top of tower 22 through line 26 as reflux. The remainder which flows through line 27 is contacted with aqueous caustic, introduced through line 28. The mixture of aqueous caustic, isobutylene and mercaptan are passed by line 29 into drum 30. In drum 30 two layers are formed, an upper layer of isobutylene, now reduced in mercaptan content, and a lower layer of caustic containing dissolved mercaptides from the reaction of the mercaptan with the caustic. The isobutylene is returned by line 31 to an optimum point in tower 2, that is, to a tray or position in the tower at which the isobutylene concentration is essentially that of the isobutylene in line 31. The caustic is withdrawn through line 32. By operating in this manner a savings in fractionating column size and caustic treating costs would be realized over the process of Figure 1.

The upper limit of methyl mercaptan concentration with which this process is still operable is the concentration of the azeotrope. This concentration of the azeotrope is 22 mol. percent methyl mercaptan when the tower is operating at 95 p. s. i. a. The concentration of the azeotrope and thus the upper limit of the methyl mercaptan in the feed, however, will vary with the total operating pressure of the tower.

A wide range of caustic concentration can be used. This range is not limited in any way by the caustic strength or the ratio of caustic to isobutylene so long as sufficient caustic is used to react with the methyl mercaptan to be removed. For best operation, however, the caustic strength should be between 0.1 and 1 normal, preferably between 0.3 and 0.5 normal. The ratio of caustic to organic phase would then be in the range of 10:1 to 1:1 by volume with the preferable operation in the range of 2 to 4 volumes of caustic per volume of organic phase. Although sodium hydroxide is the prefered alkaline reagent the application is not limited to the use of sodium hydroxide but includes also calcium oxide, calcium hydroxide, sodium carbonate and potassium hydroxide.

The nature of the present invention having thus been fully set forth and specific examples of the same given, what is claimed as new and useful and desired to be secured by Letters Patent is:

1. In a process for the preparation of substantially pure isobutylene suitable for the preparation of rubbery polymers from isobutylene containing methyl mercaptan which comprises distilling the isobutylene in a distillation zone to separate an overhead product consisting essentially of the azeotrope of methyl mercaptan with isobutylene and a bottoms product consisting essentially of pure isobutylene, the improvement which comprises removing said azeotrope from the top of the distilling zone, forming two layers which comprises separating said azeotrope with a solution of caustic by reacting the mercaptan with the caustic to form a mercaptide which is immiscible with isobutylene and condensing, stratifying said two layers to give an upper layer of isobutylene and a lower layer comprising caustic and said mercaptide, and recycling said isobutylene layer to the distilling zone as reflux.

2. In a process for the preparation of substantially pure isobutylene suitable for the preparation of rubbery polymers from isobutylene containing methyl mercaptan which comprises distilling the isobutylene in a distillation zone to separate an overhead product consisting essentially of the azeotrope of methyl mercaptan with isobutylene and a bottoms product consisting essentially of pure isobutylene, the improvement which comprises removing said azeotrope from the top of the distilling zone, condensing said azeotrope, dividing said condensed azeotrope into two azeotropic streams, recycling one stream to the top of the distillation zone as reflux, forming two layers from said other stream by separating said condensed azeotrope with a solution of caustic by reacting the mercaptan with the caustic to form a mercaptide which is immiscible with isobutylene, stratifying said layers to give an upper layer of isobutylene and a lower layer comprising caustic and said mercaptide, and recycling said isobutylene layer to the fractionation zone at the point where the isobutylene concentration in said fractionation zone approximately equals the concentration of isobutylene in said recycled upper layer.

References Cited in the file of this patent

UNITED STATES PATENTS

| | | |
|---|---|---|
| 1,676,700 | Lewis | July 10, 1928 |
| 1,866,800 | Deanesly | July 12, 1932 |
| 2,309,652 | Leum et al. | Feb. 2, 1943 |
| 2,386,772 | Badertscher et al. | Oct. 16, 1945 |
| 2,485,329 | Steele et al. | Oct. 18, 1949 |
| 2,550,091 | Seebold | Apr. 24, 1951 |
| 2,558,137 | Hepp | June 26, 1951 |
| 2,771,497 | Hunt et al. | Nov. 20, 1956 |

FOREIGN PATENTS

| | | |
|---|---|---|
| 572,297 | Great Britain | Oct. 2, 1945 |
| 572,897 | Great Britain | Oct. 29, 1945 |

OTHER REFERENCES

Murphy: "Industrial and Engineering Chemistry," 1949 (vol. 41, September–December, pp. 2727–2737).